(12) United States Patent
Dutta et al.

(10) Patent No.: US 9,682,346 B1
(45) Date of Patent: Jun. 20, 2017

(54) NANOSTRUCTURED ZINC OXIDE MEMBRANE FOR SEPARATING OIL FROM WATER

(71) Applicant: SULTAN QABOOS UNIVERSITY, Al Khodh (OM)

(72) Inventors: Joydeep Dutta, Stockholm (SE); Myo Tay Zar Myint, Muscat (OM)

(73) Assignee: SULTAN QABOOS UNIVERSITY, Al Khodh (OM)

( * ) Notice: Subject to any disclaimer, the term of this patent is extended or adjusted under 35 U.S.C. 154(b) by 0 days.

(21) Appl. No.: 15/299,439

(22) Filed: Oct. 20, 2016

(51) Int. Cl.
| | | |
|---|---|---|
| *B01D 71/02* | (2006.01) | |
| *C02F 1/44* | (2006.01) | |
| *C02F 101/32* | (2006.01) | |
| *B01D 69/12* | (2006.01) | |

(52) U.S. Cl.
CPC ........... *B01D 71/024* (2013.01); *B01D 69/12* (2013.01); *C02F 1/44* (2013.01); *B01D 2323/04* (2013.01); *B01D 2323/36* (2013.01); *B01D 2325/38* (2013.01); *C02F 2101/32* (2013.01)

(58) Field of Classification Search
None
See application file for complete search history.

(56) References Cited

U.S. PATENT DOCUMENTS

2010/0200512 A1\* 8/2010 Chase .................. B01D 17/045
　　　　　　　　　　　　　　　　　　　　　210/708
2012/0223011 A1　　9/2012 Moon et al.

FOREIGN PATENT DOCUMENTS

| CN | 101348931 A | \* | 1/2009 |
| CN | 102794113 | | 11/2012 |
| CN | 103406029 B | \* | 12/2015 |
| CN | 105478019 A | \* | 4/2016 |

\* cited by examiner

*Primary Examiner* — Krishnan S Menon
(74) *Attorney, Agent, or Firm* — Richard C. Litman

(57) ABSTRACT

A nanostructured zinc oxide membrane for removing oil from water includes a membrane and a plurality of zinc oxide nanorods on at least one surface of the membrane. The nanorods can cover less than about 40% of the surface of the membrane. Air pockets can be formed in spaces between adjacent nanorods. The nanostructured zinc oxide membranes can be used to separate oil from an oil-water mixture in a cost-effective and energy efficient manner.

9 Claims, 5 Drawing Sheets

NANOSTRUCTURED ZINC OXIDE MEMBRANE FOR SEPARATING OIL FROM WATER

BACKGROUND OF THE INVENTION

1. Field of the Invention

The present invention relates generally to membranes for separating oil from an oil-water mixture, and particularly to a nanostructured membrane including a zinc oxide nanorod coating for separating oil from an oil-water mixture.

2. Description of the Related Art

Oil-water separation has been a global challenge owing to heavy discharge of oily wastewater and frequent oil spill accidents. Currently, porous materials like sponges, meshes, and other membranes formed from flexible or rigid materials are utilized as oil-water separators. However, these traditional membranes typically tend to adsorb water along with oil due to some surface hydrophilicity. Various approaches have been put forward to overcome this challenge by modifying the surface texture and surface chemistry of such structures or membranes. Recent technologies to fabricate oil-water separating membranes involve coating membrane surfaces to render the surfaces hydrophobic. Typical coating techniques include, for example, chemical vapor deposition, layer by layer deposition, electro-spinning and chemical deposition method.

Conventional oil-water separating membranes cannot separate all of the oil from an oil-water mixture (about 50 PPM oil remains after skimming). Accordingly, oil-contaminated water remains even after conventional separation operations are completed. Further, these conventional techniques have other disadvantages, including high cost and sophisticated process requirements needing skilled manpower. Therefore it would be desirable to produce a simple and cost effective process for large scale production of modified membranes for oil-water separation, which are particularly useful for the oil and gas industry.

Thus, a nanostructured membrane capable of separating oil from water solving the aforementioned problems is desired.

SUMMARY OF THE INVENTION

A nanostructured zinc oxide membrane for removing oil from water includes a membrane substrate and a plurality of zinc oxide nanorods on at least one surface of the membrane substrate. The nanorods can cover less than about 40% of the surface of the membrane. Air pockets are thus formed in spaces between adjacent nanorods. The nanostructured zinc oxide membranes can be used to separate oil from an oil-water mixture in a cost-effective and energy efficient manner.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
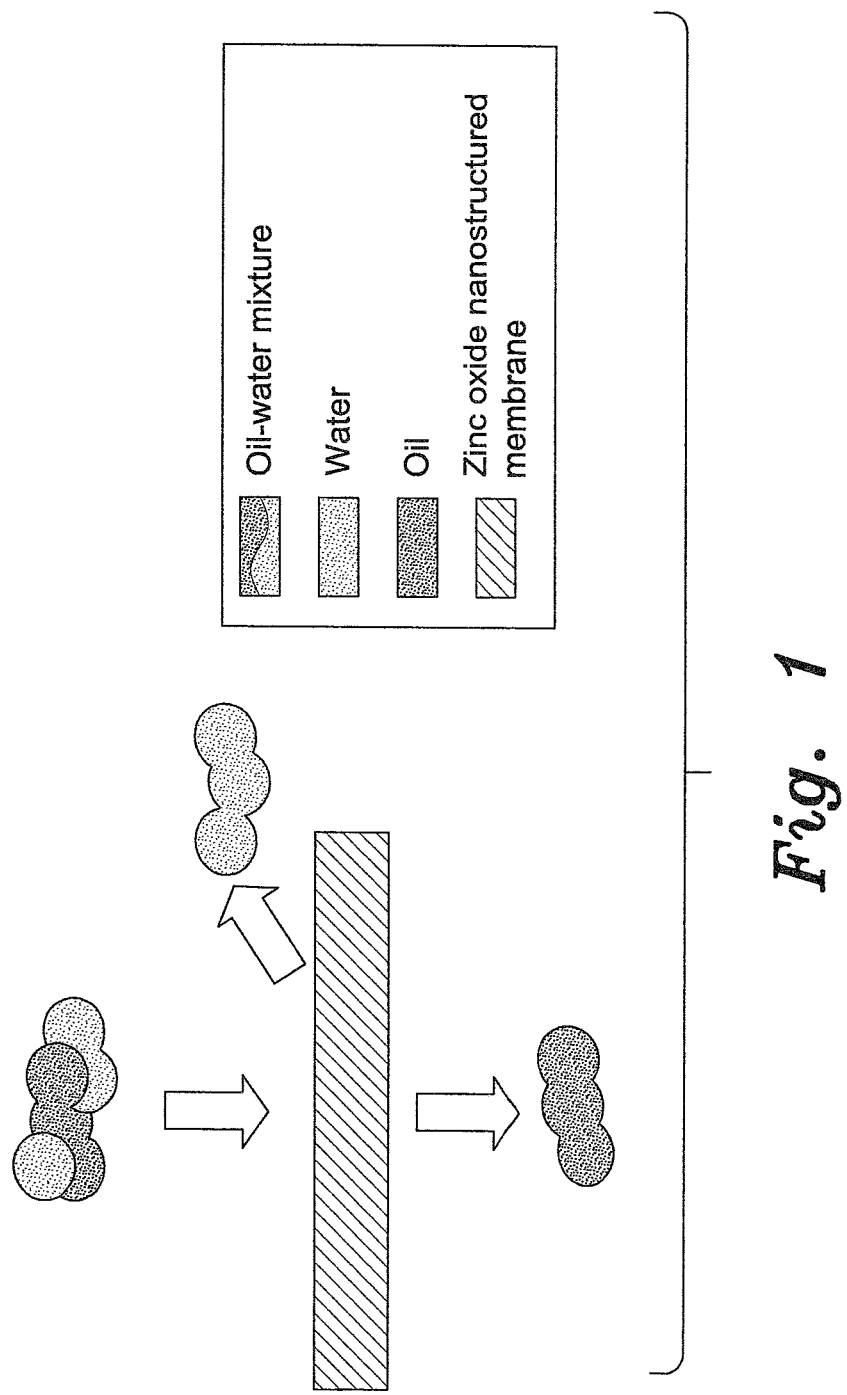
FIG. 1 is a schematic diagram illustrating an exemplary general concept of oil-water separation using the zinc oxide nanostructured membrane of the present invention.

A nanostructured zinc oxide membrane for removing oil from water includes a membrane substrate and a plurality of nanorods on at least one surface of the membrane substrate. The membrane substrate can be semi-permeable or porous. The membrane substrate or the at least one surface thereof can be hydrophobic. The membrane substrate can be a flexible or rigid material suitable for oil-water separation. The nanorods can include zinc oxide nanorods. The nanorods can cover less than about 40% of the surface of the membrane substrate. Air pockets can be formed in spaces between adjacent nanorods. The zinc oxide nanorods can render the membrane oleophilic, allowing oil to pass therethrough. A receptacle under the membrane can be used to receive the oil passing through the membrane. The nanostructured zinc oxide membranes can be used to separate oil from an oil-water mixture in a cost-effective and energy efficient manner.

An oil-water mixture can be disposed on the nanostructured zinc-oxide membrane for separating oil from the mixture. The membrane substrate can initially be formed from a hydrophobic or hydrophilic material. The hydrophobic or hydrophilic surface of the membrane substrate can be made oleophilic and/or superhydrophobic by the zinc oxide nanorods disposed thereon. The zinc oxide nanorods and air pockets formed therebetween can cause a "Fakir effect," or provide a composite surface including solid and air under the droplets of the oil-water mixture. As such, only oil and/or oil contaminants can pass through the membrane.

The nanorods include a first end which is attached to the first surface of the membrane substrate and a second, free end which is free and extends over the first surface. The nanorods can cover about 0.01% to about 40% of the first surface. The nanorods can have a diameter that ranges from about 1 nm to about 100 microns, e.g., about 1 nm to about 100 nm, and a length that ranges from about 1 micron to about 100 microns. The nanorods can be uniform or vary in length. In one embodiment, the membrane substrate can be porous. The membrane substrate can be formed from a material including at least one of a cellulosic, activated carbon, and polymeric material. The membrane substrate can include a plastic, e.g., polyethylene, polypropylene, polyvinylpyrrolidone, or various cross-linked block copolymers.

A method of fabricating a nanostructured membrane includes providing a porous membrane substrate; cleaning the porous membrane substrate; pretreating the porous membrane substrate by depositing a solution including zinc oxide nanoparticles on to a first surface of the membrane substrate to provide a pretreated membrane; growing zinc oxide nanorods on the first surface of the pretreated membrane by precipitating zinc ions under a temperature less than 100° C.

to provide a nanostructured membrane. The nanostructured membrane can then be dipped into a hydrophobic polymer solution.

A method for performing an oil/water separation can include providing a nanostructured zinc oxide membrane; depositing a liquid stream comprising oil and water onto the nanostructured zinc oxide membrane; allowing oil from the liquid stream to pass through the nanostructured zinc oxide membrane while preventing the water from the liquid stream to pass through the membrane.

As used herein the term "oleophilic" refers to a membrane having a strong affinity for oils rather than water. The term "oleophobic" refers to a membrane lacking affinity for oils. The term "hydrophobic" refers to a membrane which is resistant to or repels water. In nanotechnology, "nanorods" are one morphology of nanoscale objects. They may be synthesized from metals, metal oxides or semiconducting materials.

Referring to FIG. 1, a general concept of oil-water separation from an oil-water mixture using a nanostructured zinc oxide membrane is shown. The oil water mixture is brought into contact with the zinc oxide nanostructured membrane. The nanostructured membrane allows the oil (shaded gray) to pass through, whereas the water is repelled, i.e., is not allowed to pass through the membrane.

Figure 2:
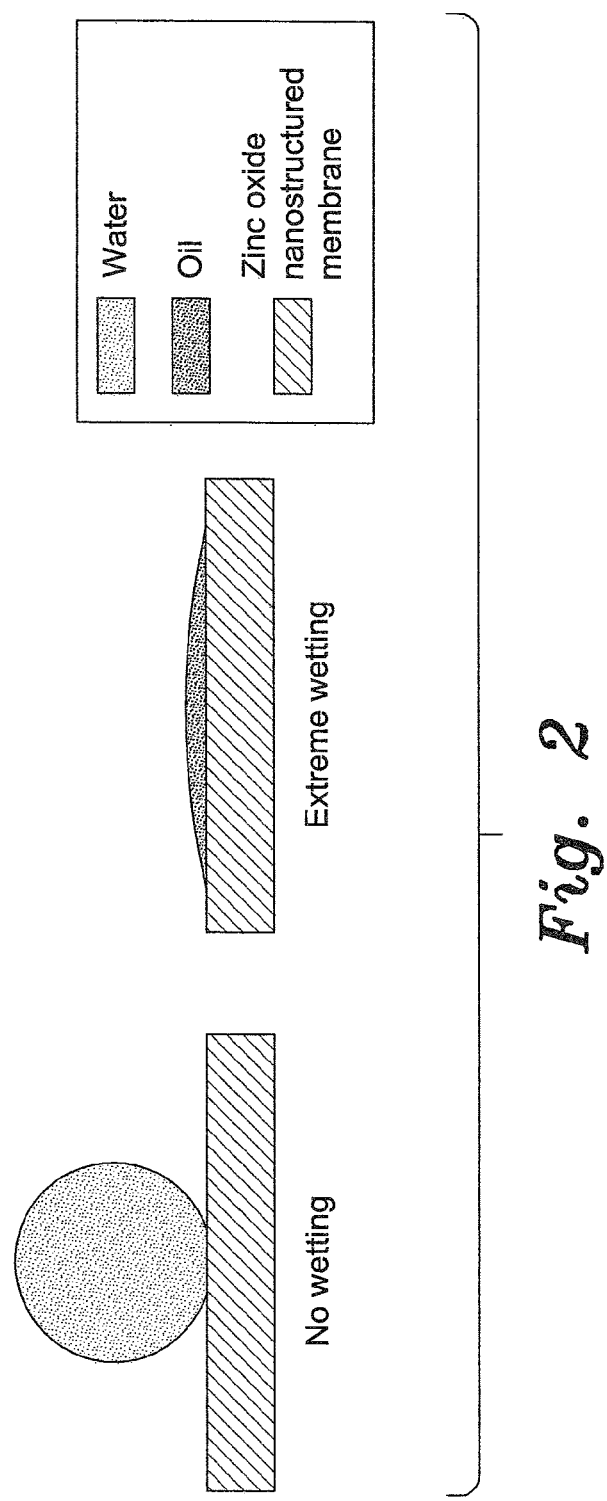
FIG. 2 is a schematic diagram comparing the surface wetting nature of pure water and pure oil on the zinc oxide nanostructured membrane of the present invention.

Referring to FIG. 2, the surface wetting nature of fabricated zinc oxide nanostructured membrane with pure water and pure oil is shown. Water droplets are repelled, whereas oil (shaded hemisphere) is not repelled from the surface of the zinc oxide nanostructured membrane.

Figure 3:
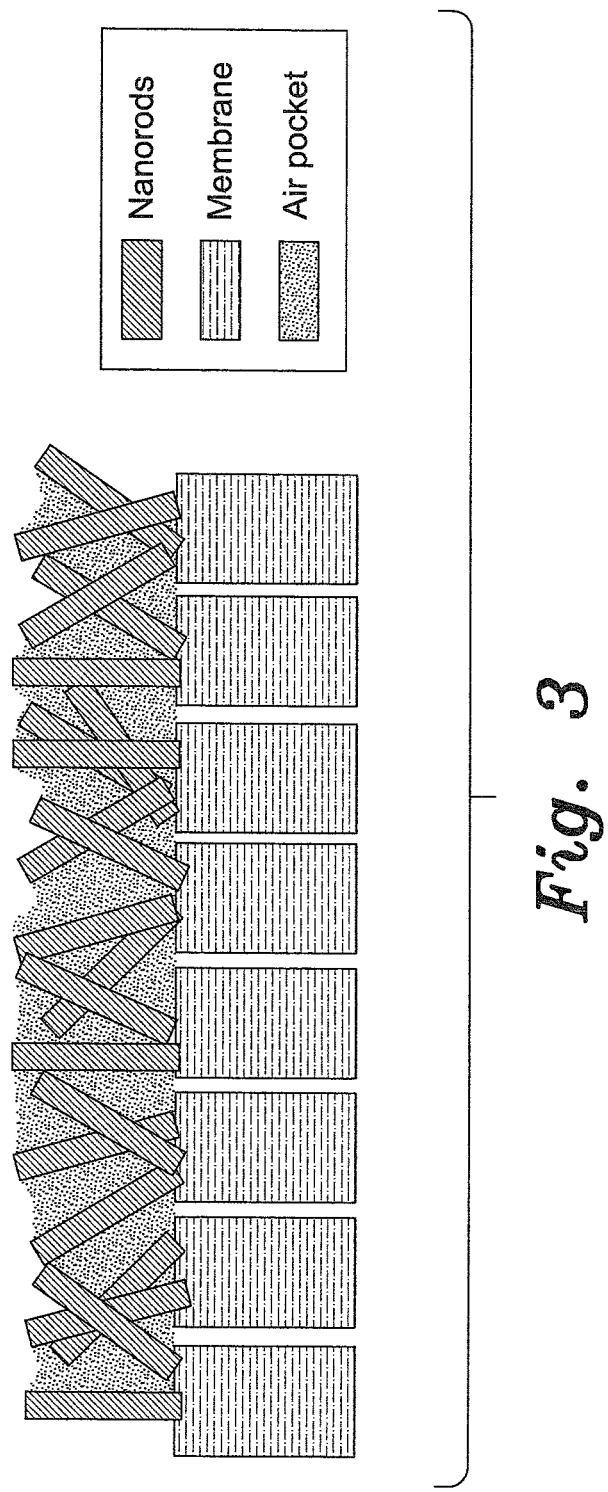
FIG. 3 is a schematic diagram illustrating the zinc oxide nanorods on the porous membrane surface of the zinc oxide nanostructured membrane of the present invention.

FIG. 3 shows the nanorods covering a portion of the porous membrane surface. Preferably, the coverage area of the nanorods on the membrane surface is less than about 40% of the membrane. The remainder of the membrane surface is filled with air. The specific length and width of the zinc oxide nanorods can be varied, e.g., in micrometer (length) and nanometer (width), as desired.

Figure 4:
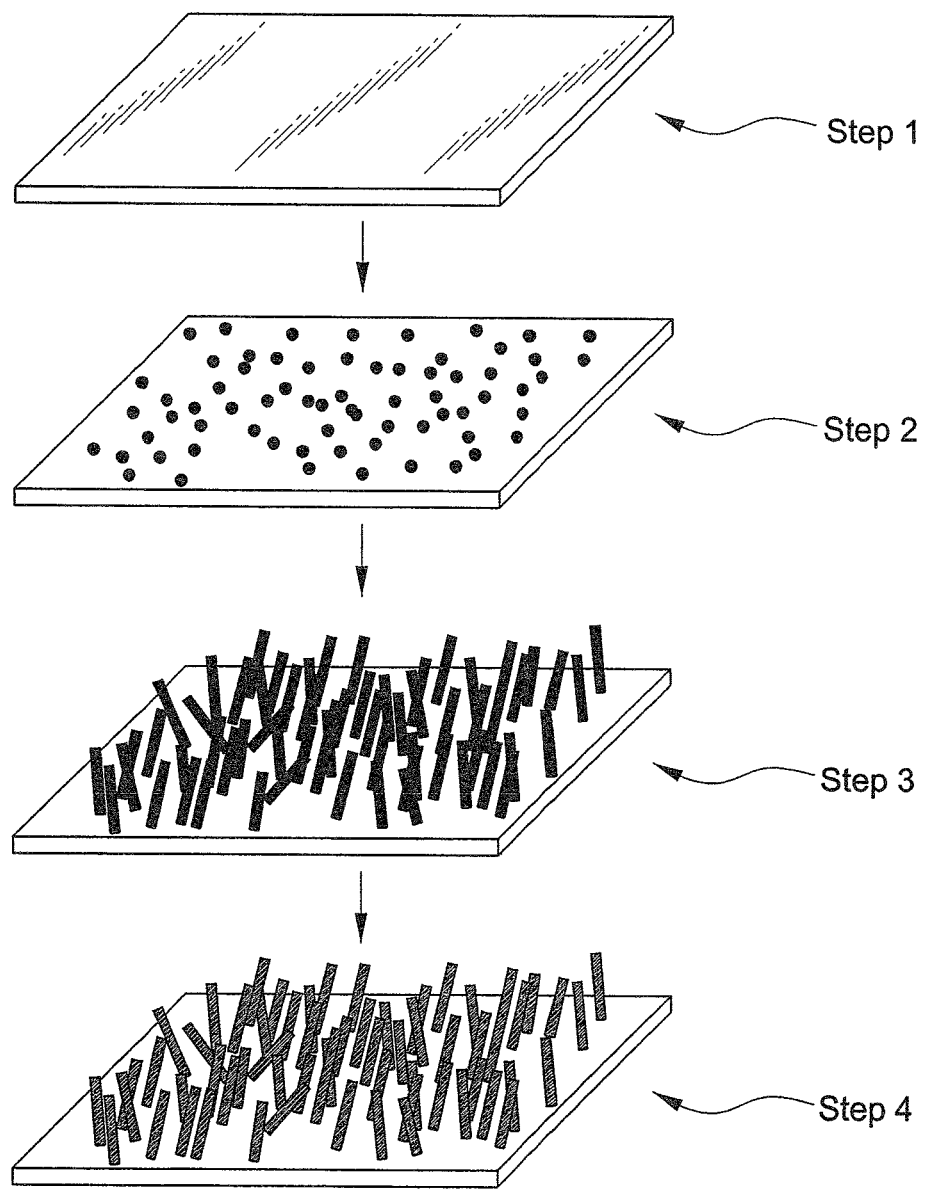
FIG. 4 is a flowchart, schematically showing the fabrication process of the nanostructured membrane using zinc oxide nanorods.

FIG. 4 shows a fabrication process flow chart including schematic diagrams representing the various steps of producing the nanostructured zinc oxide membrane. In step 1, the membrane (base substrate) is cleaned using a standard cleaning method (such as soap and water). In step 2, zinc oxide nanoparticles are deposited on the membrane, which is carried out by a simple solution dipping method wherein the solution includes zinc oxide nanoparticles. In step 3, the zinc oxide nanorods are grown on the pre-treated zinc oxide nanoparticle membrane by a simple precipitation method in a solution including zinc ions under temperatures less than about 100° C. In step 4, post-treatment of a zinc oxide nanorod decorated membrane can be carried out using a hydrophobic polymer solution in a simple solution dipping method.

Figure 5:
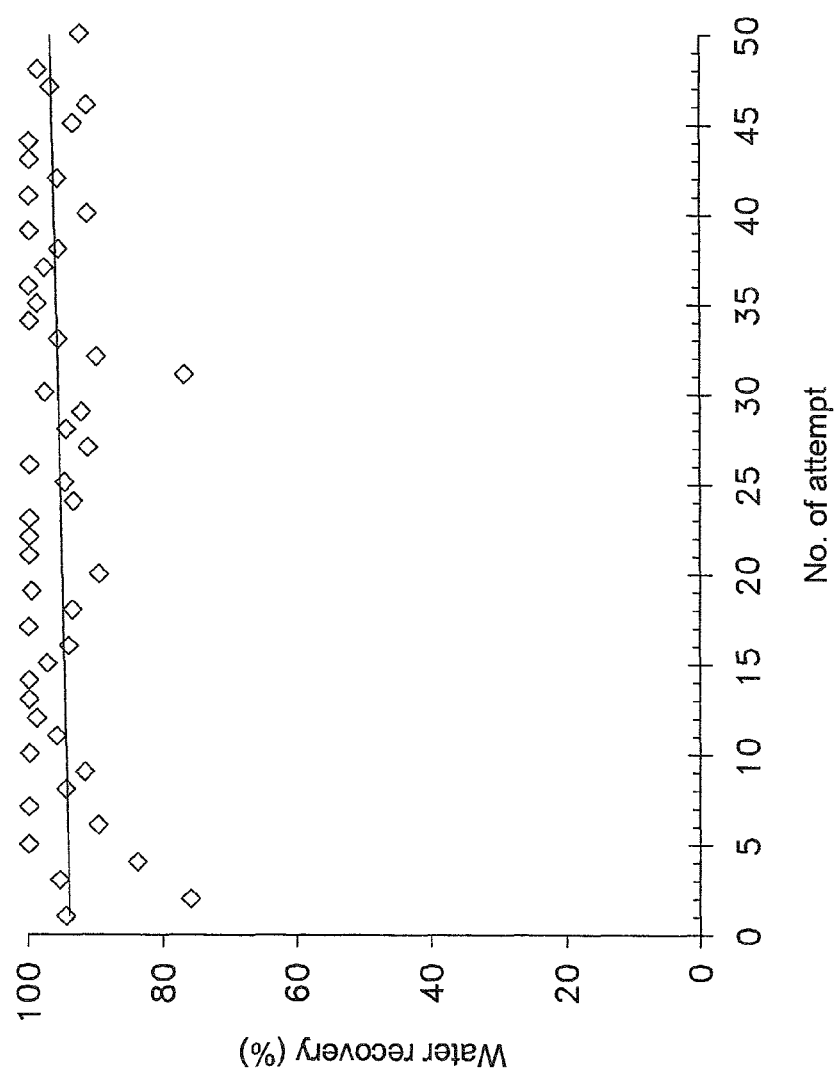
FIG. 5 is a graph showing the percentage of water recovered in oil-water separation experiments using the nanostructured membrane of the present invention.

FIG. 5 is a graph showing the percent water recovery from preliminary oil-water separation experiments using gravity flow. As evident from FIG. 5, the percentage of water recovered from an oil-water mixture including an oil to water ratio of 1:1, ranged between about 80% to about 100% for 50 trials.

Nanostructured zinc oxide membranes provide a low cost alternative for oil-water separation. Also, as demonstrated if FIG. 5, the nanostructured zinc oxide membrane efficiently repels water, thereby reducing or eliminating a risk of water clogging. The nanostructured membrane can be reused, e.g., for at least 50 different oil separation operations.

It is to be understood that the present invention is not limited to the embodiments described above, but encompasses any and all embodiments within the scope of the following claims.

We claim:

1. A nanostructured membrane consisting of:
   a membrane substrate selected from cellulosic material, activated carbon and polymeric material; and
   a plurality of zinc oxide nanorods on at least a first surface of the membrane substrate, wherein each of the nanorods includes a first attached end and a second free end, the first end being attached to the first surface and the second end extending over the first surface, further wherein at least the first surface of the membrane substrate is porous.

2. The nanostructured membrane according to claim 1, wherein the nanorods cover up to about 40% of the first surface.

3. The nanostructured membrane according to claim 1, wherein the nanorods have a length of from about 1 micron to about 100 micron.

4. The nanostructured membrane according to claim 1, wherein the nanostructured membrane is oleophilic.

5. The nanostructured membrane according to claim 1, wherein the nanorods possess varying lengths.

6. A method of fabricating a nanostructured membrane according to claim 1 comprising:
   providing a porous membrane;
   cleaning the porous membrane;
   pretreating a first surface of the porous membrane with a solution including zinc oxide nanoparticles to provide a pretreated membrane; and
   growing zinc oxide nanorods on the first surface of the pretreated membrane to provide a nanostructured membrane.

7. The method of fabricating a nanostructured membrane according to claim 6, further comprising dipping the nanostructured membrane into a hydrophobic polymer solution.

8. The method of claim 7, wherein the zinc oxide nanorods are grown on the first surface by precipitating zinc ions under a temperature less than about 100° C.

9. A method for separating oil from an oil and water mixture, the method comprising:
   providing a nanostructured membrane according to claim 1;
   passing a stream of an oil and water mixture onto the first surface;
   permitting oil from the mixture to pass through the first surface; and
   preventing water from the mixture to pass through the first surface.

* * * * *